United States Patent
Liu et al.

(10) Patent No.: US 12,520,001 B2
(45) Date of Patent: *Jan. 6, 2026

(54) TIME SYNCHRONIZATION SYSTEM OF VIDEO INFORMATION AND BUS PACKET FORMATION

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 26 days.

This patent is subject to a terminal disclaimer.

(21) Appl. No.: 18/516,995

(22) Filed: Nov. 22, 2023

(65) Prior Publication Data

US 2025/0168440 A1 May 22, 2025

(51) Int. Cl.
H04N 21/43 (2011.01)
H04N 21/434 (2011.01)

(52) U.S. Cl.
CPC ..... *H04N 21/4302* (2013.01); *H04N 21/4344* (2013.01)

(58) Field of Classification Search
CPC .............. H04N 21/4302; H04N 21/4344
See application file for complete search history.

(56) References Cited

U.S. PATENT DOCUMENTS

| | | |
|---|---|---|
| 6,236,694 B1 | 5/2001 | Blatter et al. |
| 10,742,955 B2 | 8/2020 | Karivaradaswamy |

(Continued)

FOREIGN PATENT DOCUMENTS

| | | |
|---|---|---|
| CN | 111464772 A | 7/2020 |
| CN | 111554004 A | 8/2020 |

(Continued)

OTHER PUBLICATIONS

Huijuan Han, et al., Study of Vehicle Video and CAN-Bus Data Synchronous Acquisition System, ICTIS 2013: Improving Multimodal Transportation Systems—Information, Safety, and Integration, 2013, pp. 1658-1663.

*Primary Examiner* — Jean B Corrielus
(74) *Attorney, Agent, or Firm* — Bayramoglu Law Offices LLC

(57) ABSTRACT

A time synchronization system of video information and bus packet information includes: at least one bus adapter, configured to receive and transmit bus packets; at least one video information collector, configured to collect video information; at least one computer device, including a processor, a display communicating with the processor to present a graphic interface, a readable storage medium, a communication bus and a communication interface; wherein the video information collector communicates with the processor via the communication interface; and the processor, the readable storage medium and the communication interface communicate with the bus adapter via the communication bus; the readable storage medium is configured to store an instruction program; the processor is configured to, after the bus packets and the video information are obtained, execute the instruction program; and the display is configured to display the time-synchronized bus packets and video information via the graphic interface.

16 Claims, 4 Drawing Sheets

(56) References Cited

U.S. PATENT DOCUMENTS

| | | |
|---|---|---|
| 11,108,485 B2 | 8/2021 | He et al. |
| 11,316,912 B2 | 4/2022 | Lapointe et al. |
| 2008/0201580 A1 | 8/2008 | Savitzky et al. |
| 2013/0003757 A1* | 1/2013 | Boatright ............ H04N 21/4381 370/474 |
| 2017/0064154 A1 | 3/2017 | Tseng et al. |
| 2017/0208220 A1* | 7/2017 | Stankoski ............ H04N 5/0736 |
| 2021/0377331 A1 | 12/2021 | Lapointe et al. |
| 2022/0377407 A1* | 11/2022 | Marchuk ............ H04N 21/8547 |
| 2023/0305138 A1 | 9/2023 | Zhou et al. |

FOREIGN PATENT DOCUMENTS

| | | |
|---|---|---|
| CN | 111984580 A | 11/2020 |
| CN | 112600739 A | 4/2021 |
| CN | 113395561 A | 9/2021 |
| CN | 113639764 A | 11/2021 |
| CN | 113839732 A | 12/2021 |
| RU | 2115261 C1 | 7/1998 |

* cited by examiner

TIME SYNCHRONIZATION SYSTEM OF VIDEO INFORMATION AND BUS PACKET FORMATION

TECHNICAL FIELD

The present disclosure relates to the field of vehicular software development technologies, and in particular to a time synchronization method and system of video information and bus packet formation.

BACKGROUND

In the vehicle development and validation field of Advanced Driving Assistance System (ADAS), it is usually required to collect data from multiple devices unassociated with each other. Usually, the timestamps of the devices are different, for example, the timestamp of the bus data collection device comes from itself, and the timestamp of the video collection device comes from computer. An error of the timestamp of the bus data collection device relative to the timestamp of the computer is not fixed, that is, the timestamp will become larger and larger or smaller and smaller, and when the timestamp is accumulated to some degree, the error relative to the timestamp of the computer will become very large. As a result, the data collected from the devices cannot be synchronized in time.

SUMMARY

The present disclosure provides a time synchronization system of video information and bus packet information, including:
- at least one bus adapter, configured to receive and transmit bus packets;
- at least one video information collector, configured to collect video information;
- at least one computer device, including a processor, a display communicating with the processor to present a graphic interface, a readable storage medium, a communication bus and a communication interface; wherein
- the video information collector communicates with the processor via the communication interface; and
- the processor, the readable storage medium and the communication interface communicate with the bus adapter via the communication bus;
- the readable storage medium is configured to store an instruction program;
- the processor is configured to, after the bus packets and the video information are obtained, execute the instruction program to perform the operations of: defining a timestamp of the video information as a basic timestamp; upon starting recording, obtaining a first-frame timestamp T0 of the video information, and aligning a first-frame timestamp of the bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient $k=(T1-T0)/(T2-T0)$; traversing all recorded bus packets and modifying and storing each frame timestamp Ty of these bus packets as Tx, wherein $Tx=T0+(Ty-T0)*k$; and each frame timestamp Tx of the bus packets is recorded with a clock of the video information as basis;
- the display is configured to display the time-synchronized bus packets and video information via the graphic interface.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the embodiments of the present disclosure or in the prior arts, the drawings required for descriptions of the specific embodiments or the prior arts will be briefly introduced. Apparently, the drawings described hereunder are only some embodiments of the present disclosure. Those skilled in the arts can obtain other drawings based on these drawings without making creative work.

DETAILED DESCRIPTION OF THE EMBODIMENTS

Figure 1:
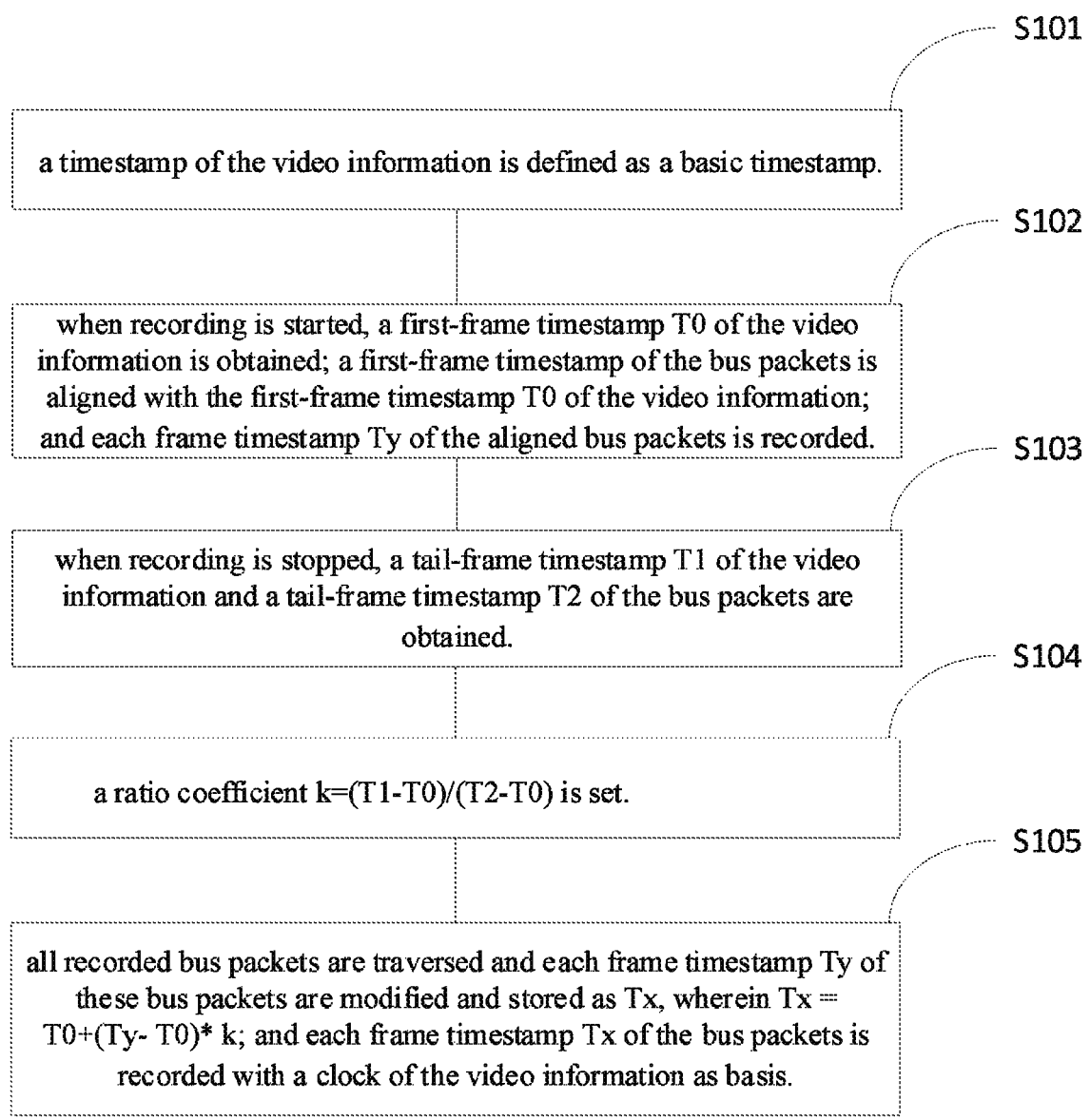
FIG. 1 is a step diagram illustrating a time synchronization method of video information and bus packet information according to one or more embodiments of the present disclosure.

In order to make the object, technical solutions and advantages of the embodiments of the present disclosure clearer, the technical solutions of the present disclosure will be fully and clearly described in combination with drawings. Apparently, the embodiments described herein are only some embodiments rather than all embodiments. All other embodiments obtained by those skilled in the art based on these drawings without making creative work shall fall within the scope of protection of the present disclosure.

In the vehicle development and validation field of Advanced Driving Assistance System (ADAS), it is usually required to collect data from multiple devices unassociated with each other. Usually, the timestamps of the devices are different, for example, the timestamp of the bus data collection device comes from itself, and the timestamp of the video collection device comes from computer. An error of the timestamp of the bus data collection device relative to the timestamp of the computer is not fixed, that is, the timestamp will become larger and larger or smaller and smaller, and when the timestamp is accumulated to some degree, the error relative to the timestamp of the computer will become very large. As a result, the data collected from the devices cannot be synchronized in time.

In the related arts, an independent device is customized to carry a vehicle video information collection function and a bus data collection function at the same time; or multiple independent devices are customized, which are connected by a synchronization line to achieve real-time synchronization in data collection process. Therefore, it is difficult to find a simple and effective method to achieve time synchronization between multiple mutually-unassociated devices.

Therefore, one or more embodiments provide a time synchronization method of video information and bus packet information, which includes:

defining a timestamp of the video information as a basic timestamp;

upon starting recording, obtaining a first-frame timestamp T0 of the video information, and aligning a first-frame timestamp of the bus packets with the first-frame timestamp T0 of the video information and recording each frame timestamp Ty of the aligned bus packets;

upon stopping recording, obtaining a tail-frame timestamp T1 of the video information and a tail-frame timestamp T2 of the bus packets;

setting a ratio coefficient k=(T1−T0)/(T2−T0);

traversing all recorded bus packets and modifying and storing each frame timestamp Ty of these bus packets as Tx, wherein Tx=T0+(Ty−T0)*k; and each frame timestamp Tx of the bus packets is recorded with a clock of the video information as basis.

In the time synchronization method of the video information and the bus packet information, which is applied to the vehicle ADAS development and validation field, without the customized devices, data can be collected simultaneously and finally synchronized by using mutually-unassociated video collection device and bus collection device, so as to solve the problem of the timestamps of synchronous collection of video and bus data of multiple devices, thereby improving the collection efficiency.

Various non-limiting implementations of the embodiments of the present disclosure will be detailed below in combination with drawings.

As shown in FIG. 1, one or more embodiments provide a time synchronization method of video information and bus packet information, which includes the following steps.

At step S101, a timestamp of the video information is defined as a basic timestamp.

At step S102, when recording is started, a first-frame timestamp T0 of the video information is obtained; a first-frame timestamp of the bus packets is aligned with the first-frame timestamp T0 of the video information; and each frame timestamp Ty of the aligned bus packets is recorded.

At step S103, when recording is stopped, a tail-frame timestamp T1 of the video information and a tail-frame timestamp T2 of the bus packets are obtained.

At step S104, a ratio coefficient k=(T1−T0)/(T2−T0) is set.

At step S105, all recorded bus packets are traversed and each frame timestamp Ty of these bus packets are modified and stored as Tx, wherein Tx=T0+(Ty−T0)*k; and each frame timestamp Tx of the bus packets is recorded with a clock of the video information as basis.

The time synchronization method of the video information and the bus packet information will be detailed below by way of an example.

In vehicle developments, video information is recorded by using a camera V1 and packet information of power CAN is recorded by using one bus adapter PCAN.

After the camera V1 and the bus adapter PCAN are started simultaneously, a video frame timestamp (for example, 2023 Aug. 13 09:01:02.123, which means nine hours one minute, two seconds, 123 milliseconds, Aug. 13, 2023) transmitted back by the camera V1 at a next moment is defined as the first-frame timestamp T0. The timestamps of the bus packet information after the time of the first-frame timestamp T0 are all set relative to the first-frame timestamp T0, namely, the timestamp Ty of the bus packet information at the time of the first-frame timestamp T0 is the first-frame timestamp T0. Thus, the timestamp Ty of the bus packet information at the time of one second after the time of the first-frame timestamp T0 is 2023 Aug. 13 09:01:03.123, which means nine hours one minute, three seconds, 123 milliseconds, Aug. 13, 2023.

If the recording is stopped after 60 minutes of synchronous collection, the tail-frame timestamp T1 of the video information at the time of stopping the recording is 2023 Aug. 13 10:01:02.123, which means ten hours one minute, two seconds, 123 milliseconds, Aug. 13, 2023. At this time, the tail-frame timestamp T2 of the collected bus packet information of the bus adapter PCAN is 3590 seconds. Hence, the ratio coefficient is k=(T1−T0)/(T2−T0)=3600/3590=1.002785515320334

All recorded bus packets are traversed and each frame timestamp Ty is modified to Tx, where Tx=T0+(Ty−T0)*k. The bus packet data file is stored. In this way, the time synchronization of the video information and the bus packet information can be achieved.

In some embodiments, a method of aligning the first-frame timestamp collected for the bus packets with the first-frame timestamp T0 of the video information, and recording each frame timestamp Ty collected for the aligned bus packets includes:

defining the first-frame timestamp collected for the bus packets as T3;

defining the timestamp collected for any bus packet in a recording process as T, and obtaining each frame timestamp Ty collected for the aligned bus packets as Ty=T−T3+T0.

The method of aligning the first-frame timestamp collected for the bus packets with the first-frame timestamp T0 of the video information, and recording each frame timestamp Ty collected for the aligned bus packets will be detailed below by way of an example.

In vehicle ADAS developments, video information is recorded by using one camera V1 and packet information of power CAN is recorded by using one bus adapter PCAN.

After the camera V1 and the bus adapter PCAN are started simultaneously, a video frame timestamp (for example, 2023 Aug. 13 09:01:02.123, which means nine hours one minute, two seconds, 123 milliseconds, Aug. 13, 2023) transmitted back by the camera V1 at a next moment is defined as the first-frame timestamp T0.

After the first-frame timestamp T0 is defined, the first-frame timestamp collected for the bus packets is T3, for example, T3=1234567 milliseconds.

Thus, the timestamp collected for any bus packet after the first-frame timestamp T3 is T, for example, T=2234567 milliseconds. Based on the alignment method, Ty=T−T3+T0 and T−T3=1000000 milliseconds, i.e. 1 second, and thus, Ty=2023 Aug. 13 09:01:03.123 which means nine hours one minute, three seconds, 123 milliseconds, Aug. 13, 2023.

In some embodiments, the video information is transmitted in real time to a computer device; and the bus packets are transmitted to the computer device via the bus adapter.

Specifically, after the collection times of the video information and the bus packet information are synchronized, the computer can synchronously collect the video information and the bus packets.

In some embodiments, a transmission frame rate of the bus packets is not less than 1000 frames/second.

Specifically, the transmission frame rate is not less than 1000 frames/second, that is, the bus packets are sent at an interval of less than 1 millisecond, which means a time error between the tail frame of the bus packets and the tail frame of the video information is less than 1 millisecond, so as to ensure synchronous collection accuracy of the video information and the bus packet data.

Figure 2:
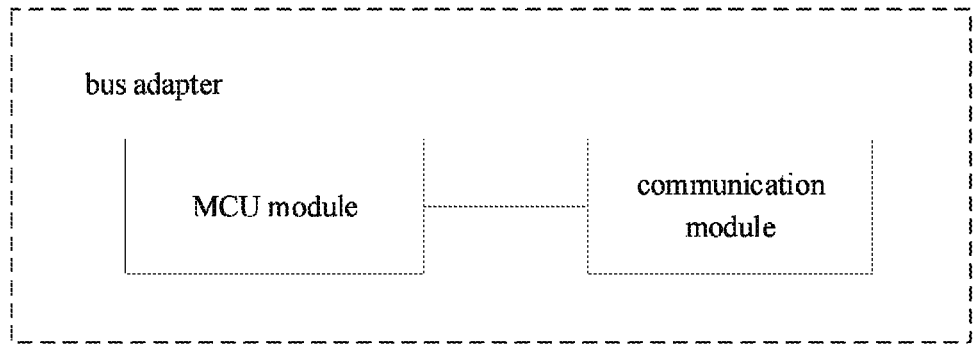
FIG. 2 is a principle block diagram illustrating a bus adapter according to one or more embodiments of the present disclosure.

As shown in FIG. 2, one or more embodiments further provide a bus adapter, configured to transmit the bus packets in the time synchronization method of the video information and the bus packet information to a computer device. The bus adapter includes:
  a microcontroller unit (MCU) module, configured to perform bus packet transmission and reception, and generate frame-rate compensation packets as bus packets at the time of the frame rate lower than 1000 frames/second; and
  a communication module, configured to connect with the MCU module and send the bus packets to the computer device upon connecting with the bus adapter.

Figure 3:
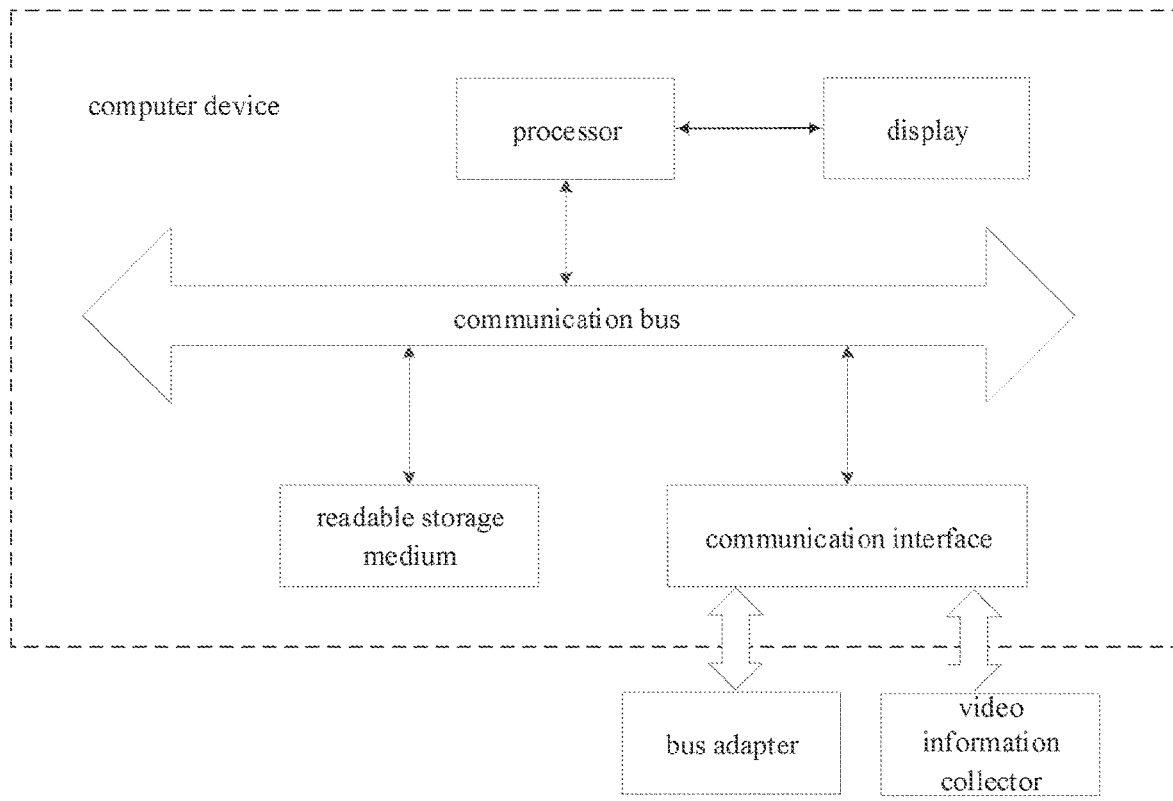
FIG. 3 is a principle block diagram illustrating a system for implementing time synchronization between video information and bus message information according to one or more embodiments of the present disclosure.

As shown in FIG. 3, one or more embodiments further provide a time synchronization system of video information and bus packet information, which includes:
  at least one bus adapter, configured to receive and transmit bus packets;
  at least one video information collector, configured to collect video information;
  at least one computer device, including a processor, a display communicating with the processor to present a graphic interface, a readable storage medium, a communication bus and a communication interface; wherein
  the video information collector communicates with the processor via the communication interface; and
  the processor, the readable storage medium and the communication interface communicate with the bus adapter via the communication bus;
  the readable storage medium is configured to store an instruction program;
  the processor is configured to, after the bus packets and the video information are obtained, execute the instruction program to perform the operations of: defining a timestamp of the video information as a basic timestamp; upon starting recording, obtaining a first-frame timestamp T0 of the video information, and aligning a first-frame timestamp of the bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient k=(T1−T0)/(T2−T0); traversing all recorded bus packets and modifying and storing each frame timestamp Ty of these bus packets as Tx, wherein Tx=T0+(Ty−T0)*k; and each frame timestamp Tx of the bus packets is recorded with a clock of the video information as basis;
  the display is configured to display the time-synchronized bus packets and video information via the graphic interface.

Figure 4:
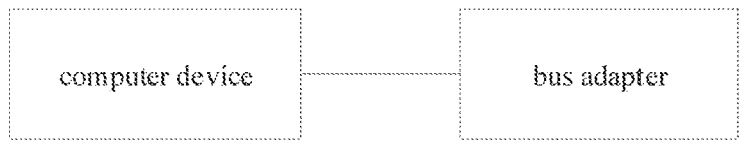
FIG. 4 is a principle block diagram illustrating a system for implementing time synchronization between video information and bus message information according to one or more embodiments of the present disclosure.
Figure 5:
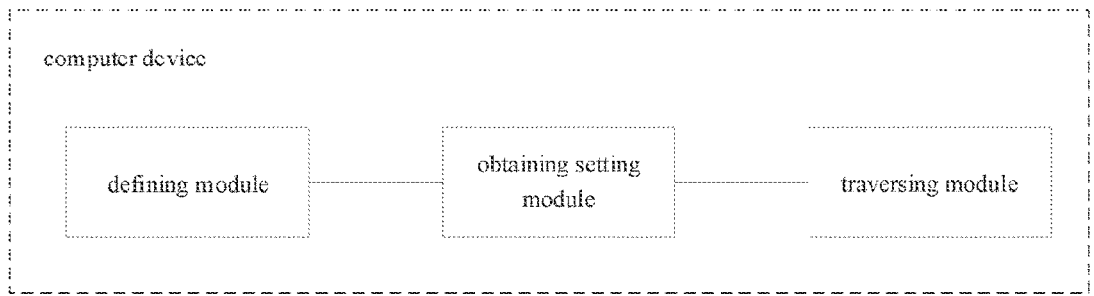
FIG. 5 is a principle block diagram illustrating a computer device according to one or more embodiments of the present disclosure.

As shown in FIG. 4, one or more embodiments further provide a time synchronization system of video information and bus packet information, including: a computer device and at least one bus adapter mentioned above, As shown in FIG. 5, the computer device is configured to execute a defining module, an obtaining setting module and a traversing module; wherein
  the defining module is configured to define a timestamp of the video information as a basic timestamp;
  the obtaining setting module is configured to, when recording is started, obtain a first-frame timestamp T0 of the video information, and align a first-frame timestamp of the bus packets from at least one bus adapter with the first-frame timestamp T0 of the video information, and record each frame timestamp Tyn of the aligned bus packets; when the recording is stopped, obtain a tail-frame timestamp T1 of the video information, and a tail-frame timestamp T2n of the bus packets; and set a ratio coefficient kn=(T1−T0)/(T2n−T0), where n is an index number of the bus adapter; and
  the traversing module is configured to traverse all recorded bus packets, and modify and store each frame timestamp Tyn as Txn, where Txn=T0+(Tyn−T0)*kn, and each frame timestamp Txn of the bus packets is recorded with a clock of the video information as basis.

The computer instructions corresponding to the specific implementation functions of the defining module, the obtaining setting module and the traversing module are stored in the computer readable storage medium and implemented in the computer device. For details, reference may be made to the contents of the above time synchronization method of the video information and the bus packet information, and no redundant descriptions are made herein.

An electronic device in the embodiments of the present disclosure will be described below from the angle of hardware processing.

In the embodiments of the present disclosure, no limitation is made on the specific implementation of the electronic device.

Figure 6:
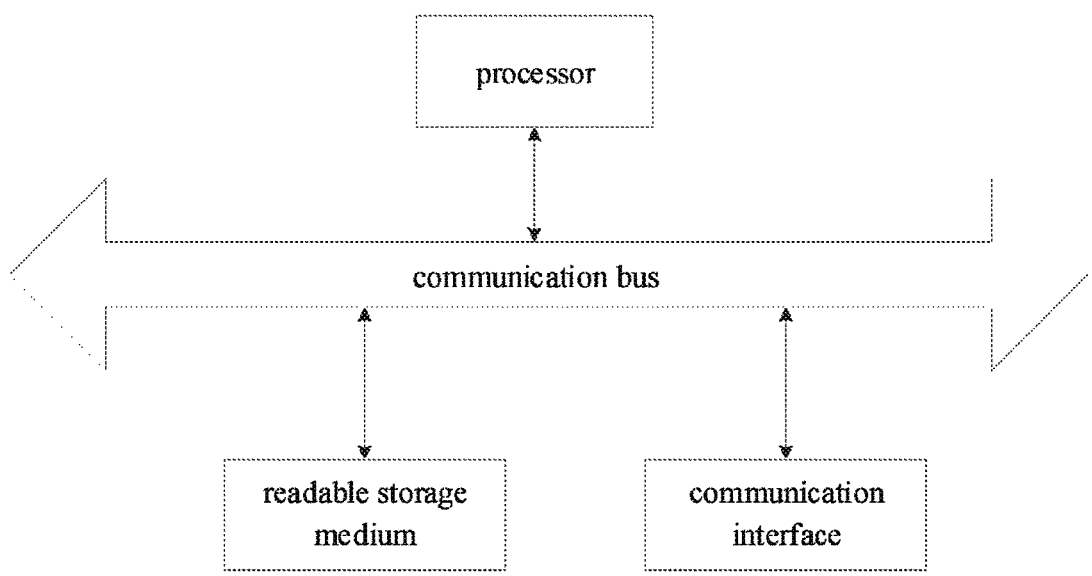
FIG. 6 is a principle block diagram illustrating an apparatus according to one or more embodiments of the present disclosure.

As shown in FIG. 6, one or more embodiments further provide an apparatus, which includes:
  at least one readable storage medium, storing instructions;
  at least one processor, configured to execute the instructions to perform the operations of: defining a timestamp of video information as a basic timestamp; upon starting recording, obtaining a first-frame timestamp T0 of the video information, and aligning a first-frame timestamp of bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient k=(T1−T0)/(T2−T0); traversing all recorded bus packets and modifying and storing each frame timestamp Ty of these bus packets as Tx, wherein Tx=T0+(Ty−T0)*k; and each frame timestamp Tx of the bus packets is recorded with a clock of the video information as basis.

Specifically, the apparatus further includes a communication bus and a communication interface; the processor, the readable storage medium and the communication interface communicate with each other via the communication bus.

Figure 7:
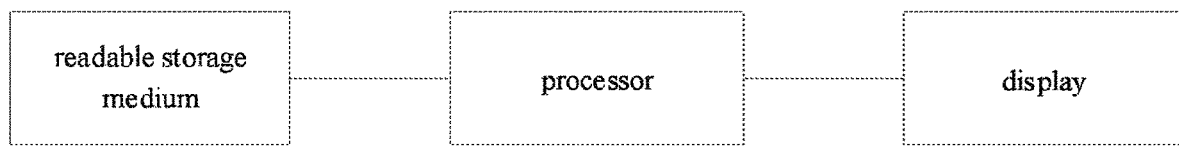
FIG. 7 is a principle block diagram illustrating an electronic device according to one or more embodiments of the present disclosure.

As shown in FIG. 7, one or more embodiments further provide an electronic device, which includes: a processor, a display communicating with the processor to present a graphic interface, and a readable storage medium; wherein the readable storage medium is configured to store an instruction program;

the processor is configured to execute the instruction program to perform the operations of: defining a timestamp of video information as a basic timestamp; upon starting recording, obtaining a first-frame timestamp T0 of the video information, and aligning a first-frame timestamp of bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient k=(T1−T0)/(T2−T0); traversing all recorded bus packets and modifying and storing each frame timestamp Ty of these bus packets as Tx, wherein Tx=T0+(Ty−T0)*k; and each frame timestamp Tx of the bus packets is recorded with a clock of the video information as basis;

the display is configured to display the time-synchronized bus packets and video information via the graphic interface.

In some embodiments, the computer device, the industrial personal computer and apparatus may also be used as one of the electronic devices.

The structures shown in FIG. 7 do not constitute any limitation to the electronic device, and the electronic device may further include more or less components than shown in the drawings or combine some components or have different component deployments.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU)•a processor, a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

Optionally, the computer device may also include a user interface, which may include a display, and an input unit, for example, a keyboard. Optionally, the user interface may also include a standard wired interface and wireless interface. Optionally, in some embodiments, the display may be an LED display, a liquid crystal display, a touch liquid crystal display and an Organic Light-Emitting Diode (OLED) touch display and the like. The display may also be appropriately referred to as display screen or display unit for displaying information processed in the computer device as well as a visual user interface.

The processor executes the program to perform the steps in the embodiments of the time synchronization method of the video information and the bus packet information shown in FIG. 1, for example, the steps S101 to S105. Alternatively, the processor executes the computer program to implement the functions of the modules or units in the apparatus embodiments.

One or more embodiments further provide a computer readable storage medium, configured to store programs of performing any one of the time synchronization methods of the video information and the bus packet information.

One or more embodiments further provide a computer readable storage medium, storing computer readable instructions. The instructions are executed by at least one processor to perform the above time synchronization method of the video information and the bus packet information, which specifically includes: defining a timestamp of the video information as a basic timestamp; upon starting recording, obtaining a first-frame timestamp T0 of the video information, and aligning a first-frame timestamp of the bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient k=(T1−T0)/(T2−T0); traversing all recorded bus packets and modifying and storing each frame timestamp Ty of these bus packets as Tx, wherein Tx=T0+(Ty−T0); and each frame timestamp Tx of the bus packets is recorded with a clock of the video information as basis. For details, reference may be made to the specific descriptions of the time synchronization method of the video information and the bus packet information and no redundant descriptions are made herein.

One or more embodiments further provide a computer program product, which includes computer programs or instructions, where the computer programs or instructions are executed on a computer to cause the computer to perform any one of the time synchronization methods of the video information and the bus packet information.

One or more embodiments further provide a computer program product, including a computer readable storage medium storing computer readable program codes thereon, where the computer readable program codes include instructions which cause at least one processor to perform the operations of:

defining a timestamp of video information as a basic timestamp;

upon starting recording, obtaining a first-frame timestamp T0 of the video information, and aligning a first-frame timestamp of bus packets with the first-frame timestamp T0 of the video information and recording each frame timestamp Ty of the aligned bus packets;

upon stopping recording, obtaining a tail-frame timestamp T1 of the video information and a tail-frame timestamp T2 of the bus packets;

setting a ratio coefficient $k=(T1-T0)/(T2-T0)$;

traversing all recorded bus packets and modifying and storing each frame timestamp Ty of these bus packets as Tx, wherein $Tx=T0+(Ty-T0)*k$; and each frame timestamp Tx of the bus packets is recorded with a clock of the video information as basis.

For details, reference may be made to the detailed descriptions of the time synchronization method of the video information and the bus packet information and no redundant descriptions are made herein.

Figure 8:
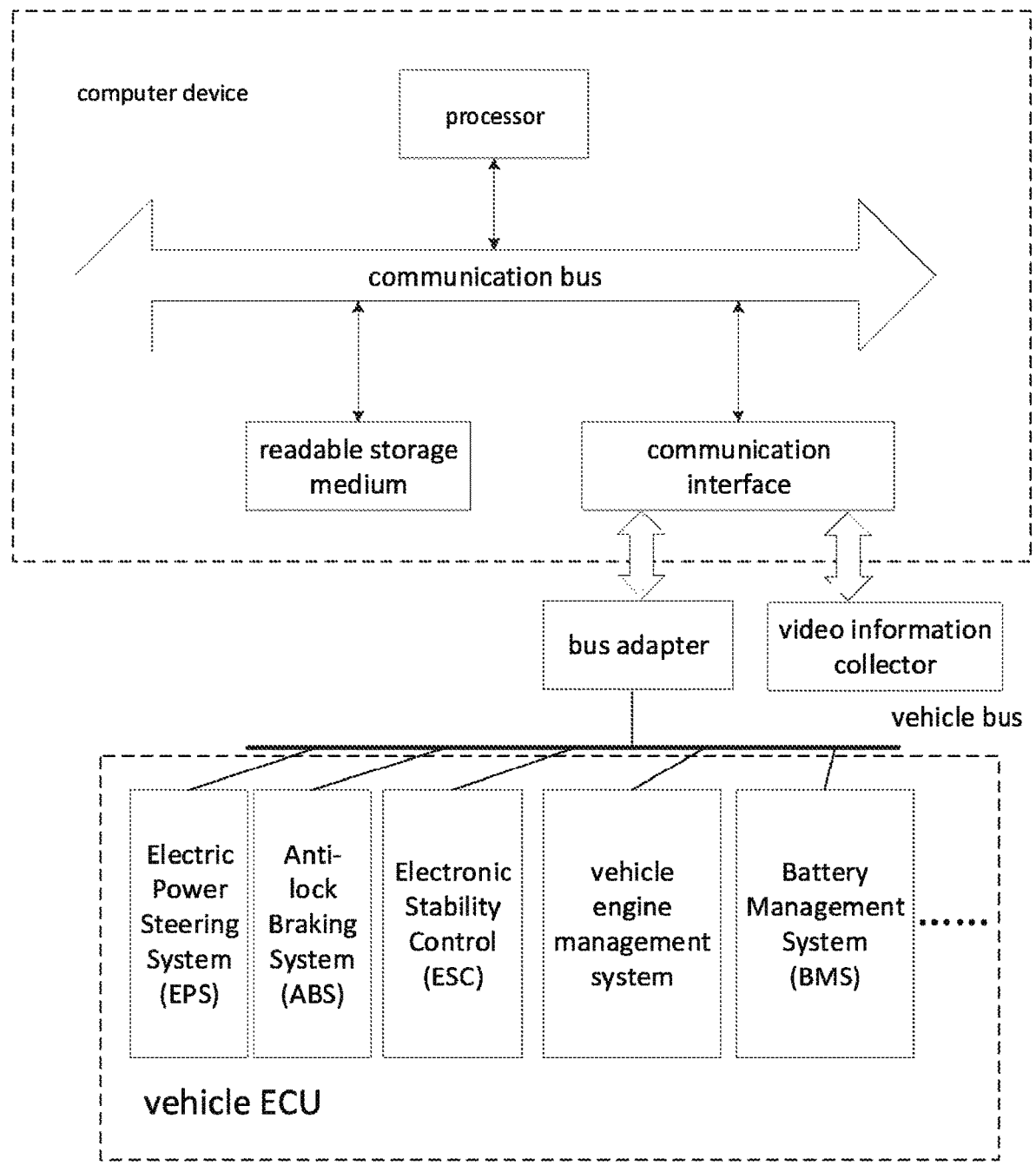
FIG. 8 is a principle block diagram illustrating a system according to one or more embodiments of the present disclosure.

As shown in FIG. 8, one or more embodiments further provide a system, including:

a computer device, a bus adapter, and a video information collector; where, the computer device includes a processor, a readable storage medium, a communication bus, and a communication interface; where, the video information collector communicates with the processor via the communication interface; and the processor, the readable storage medium and the communication interface communicate with the bus adapter via the communication bus;

the readable storage medium is configured to store an instruction program;

the processor is configured to, after bus packets and video information are obtained, execute the instruction program to perform the operations of: defining a timestamp of the video information as a basic timestamp; upon starting recording, obtaining a first-frame timestamp T0 of the video information, and aligning a first-frame timestamp of the bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a ratio coefficient $k=(T1-T0)/(T2-T0)$; traversing all recorded bus packets and modifying and storing each frame timestamp Ty of these bus packets as Tx, wherein $Tx=T0+(Ty-T0)*k$; and each frame timestamp Tx of the bus packets is recorded with a clock of the video information as basis.

In some embodiments, the video information collector communicates with the processor via the communication interface, for example, via a USB interface, or obtains the video information by using the video collection device such as video collection card.

One or more embodiments further provide a method, including:

transmitting and receiving bus packets via a bus adapter;

collecting video information via a video information collector;

after the bus packets and the video information are obtained, executing instructions to cause a processor to perform the operations of: defining a timestamp of the video information as a basic timestamp; upon starting recording, obtaining a first-frame timestamp T0 of the video information, and aligning a first-frame timestamp of the bus packets with the first-frame timestamp T0 of the video information and recording each frame timestamp Ty of the aligned bus packets; upon stopping recording, obtaining a tail-frame timestamp T1 of the video information and a tail-frame timestamp T2 of the bus packets; setting a scale coefficient $k=(T1-T0)/(T2-T0)$; traversing all recorded bus packets and modifying and storing each frame timestamp Ty of these bus packets as Tx, wherein $Tx=T0+(Ty-T0)*k$; and each frame timestamp Tx of the bus packets is recorded with a clock of the video information as basis;

displaying the time-synchronized bus packets and video information via a graphic interface.

In some embodiments, the bus adapter may be a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, a FlexRay bus adapter, or may be one-to-many or many-to-many. In some other embodiments, no limitation is made to the specific implementation of the bus adapter.

In some embodiments, the computer device may obtain the bus packets by performing communication based on Unified Diagnostic Services (UDS) or Universal Measurement and Calibration Protocol (XCP) or CAN Calibration Protocol (CCP) protocol.

In some embodiments, the bus packets may also be transmitted by communicating with the debugging device, for example, vehicle Electronic Control Unit (ECU) device and its relevant systems based on UDS or XCP or CCP protocol.

In some embodiments, the method and system may cover the time synchronization scenarios of the video information and the bus packet information in the fields of vehicles, aerospace, ships, machinery and automation. For the field of vehicles, the method and system may specifically include a vehicle ECU and its relevant systems which include but not limited to Electric Power Steering System (EPS), Anti-lock Braking System (ABS), Electronic Stability Control (ESC), vehicle engine management system and Battery Management System (BMS) and the like, which can be connected to the computer device via a bus to achieve bus packet transmission.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as independent products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A time synchronization system of video information and bus packet information, comprising:
    a bus adapter, configured to receive and transmit bus packets;
    a video information collector, configured to collect video information;
    a computer device, comprising a processor, a display communicating with the processor to present a graphic interface, a readable storage medium, a communication bus and a communication interface; wherein
    the video information collector communicates with the processor via the communication interface; and
    the processor, the readable storage medium and the communication interface communicate with the bus adapter via the communication bus;
    the readable storage medium is configured to store an instruction program;
    the processor is configured to, after the bus packets and the video information are obtained, execute the instruction program to perform operations of:
        defining a timestamp of the video information as a basic timestamp;
        upon starting recording, obtaining a first-frame timestamp T0 of the video information, and aligning a first-frame timestamp of the bus packets with the first-frame timestamp T0 of the video information to obtain aligned bus packets and recording each frame timestamp Ty of the aligned bus packets;
        upon stopping recording, obtaining a tail-frame timestamp T1 of the video information and a tail-frame timestamp T2 of the bus packets;
        setting a ratio coefficient $k=(T1-T0)/(T2-T0)$;
        traversing all recorded bus packets and modifying and storing each frame timestamp Ty of the bus packets as Tx, wherein $Tx=T0+(Ty-T0)*k$; and
        recording each frame timestamp Tx of the bus packets with a clock of the video information as basis; and
    the display is configured to display the time-synchronized bus packets and video information via the graphic interface.

2. The time synchronization system according to claim 1, wherein the processor is configured to align the first-frame timestamp collected for the bus packets with the first-frame timestamp T0 of the video information to obtain the aligned bus packets and record each frame timestamp Ty collected for the aligned bus packets by
    defining the first-frame timestamp collected for the bus packets as T3;
    defining a timestamp collected for any bus packet in a recording process as T, and obtaining each frame timestamp Ty collected for the aligned bus packets as $Ty=T-T3+T0$.

3. The time synchronization system according to claim 1, wherein
    a transmission frame rate of the bus packets transmitted to the processor via the bus adapter is greater than or equal to 1000 frames/second.

4. The time synchronization system according to claim 1, wherein
    the bus adapter is a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, or a FlexRay bus adapter; and
    the bus packets are transmitted to or from the processor of the computer device by communicating with the computer device based on Unified Diagnostic Services (UDS) or Universal Measurement and Calibration Protocol (XCP) or CAN Calibration Protocol (CCP) protocol.

5. The time synchronization system according to claim 1, wherein
    the bus adapter comprises:
    a microcontroller unit (MCU) module, configured to perform bus packet transmission and reception, and generate frame-rate compensation packets as the bus packets at a time of a frame rate lower than 1000 frames/second; and
    a communication module, configured to connect with the MCU module and send the bus packets to the computer device upon connecting with the bus adapter.

6. The bus adapter of the time synchronization system of the video information and the bus packet information according to claim 1, the bus adapter comprising:
    a microcontroller unit (MCU) module, configured to perform bus packet transmission and reception, and generate frame-rate compensation packets as the bus packets at a time of a frame rate lower than 1000 frames/second; and
    a communication module, configured to connect with the MCU module and send the bus packets to the computer device upon connecting with the bus adapter.

7. The bus adapter according to claim 6, wherein
    the bus adapter is a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, or a FlexRay bus adapter; and
    the bus packets are transmitted to or from the computer device by communicating with the computer device based on Unified Diagnostic Services (UDS) or Universal Measurement and Calibration Protocol (XCP) or CAN Calibration Protocol (CCP) protocol.

8. A system, comprising:
    a computer device, a bus adapter, and a video information collector; wherein the computer device comprises a processor, a readable storage medium, a communication bus, and a communication interface; wherein the video information collector communicates with the processor via the communication interface; and the processor, the readable storage medium and the communication interface communicate with the bus adapter via the communication bus;

the readable storage medium is configured to store an instruction program;

the processor is configured to, after bus packets and video information are obtained, execute the instruction program to perform operations of:
  defining a timestamp of the video information as a basic timestamp;
  upon starting recording, obtaining a first-frame timestamp T0 of the video information, and aligning a first-frame timestamp of the bus packets with the first-frame timestamp T0 of the video information to obtain aligned bus packets and recording each frame timestamp Ty of the aligned bus packets;
  upon stopping recording, obtaining a tail-frame timestamp T1 of the video information and a tail-frame timestamp T2 of the bus packets;
  setting a ratio coefficient $k=(T1-T0)/(T2-T0)$;
  traversing all recorded bus packets and modifying and storing each frame timestamp Ty of the bus packets as Tx, wherein $Tx=T0+(Ty-T0)*k$; and
  recording each frame timestamp Tx of the bus packets with a clock of the video information as basis.

9. The system according to claim 8, wherein the processor is configured to align the first-frame timestamp collected for the bus packets with the first-frame timestamp T0 of the video information to obtain the aligned bus packets and record each frame timestamp Ty collected for the aligned bus packets by:
  defining the first-frame timestamp collected for the bus packets as T3; and
  defining a timestamp collected for any bus packet in a recording process as T, and obtaining each frame timestamp Ty collected for the aligned bus packets as $Ty=T-T3+T0$.

10. The system according to claim 8, wherein
a transmission frame rate of the bus packets transmitted to the processor via the bus adapter is greater than or equal to 1000 frames/second.

11. The system according to claim 8, wherein
the bus adapter is a Controller Area Network (CAN) bus adapter, a Controller Area Network Flexible Data Rate (CANFD) bus adapter, a Fast Local Interconnect Network (FastLIN) bus adapter, a Local Interconnect Network (LIN) bus adapter, an Ethernet bus adapter, or a FlexRay bus adapter; and
the bus packets are transmitted to or from the computer device by communicating with the computer device based on Unified Diagnostic Services (UDS) or Universal Measurement and Calibration Protocol (XCP) or CAN Calibration Protocol (CCP) protocol.

12. The system according to claim 8, wherein
the bus adapter comprises:
a microcontroller unit (MCU) module, configured to perform bus packet transmission and reception, and generate frame-rate compensation packets as the bus packets at a time of a frame rate lower than 1000 frames/second;
a communication module, configured to connect with the MCU module and send the bus packets to the computer device upon connecting with the bus adapter.

13. A method, comprising:
transmitting and receiving bus packets via a bus adapter;
collecting video information via a video information collector;
after the bus packets and the video information are obtained, executing instructions to cause a processor to perform operations of:
  defining a timestamp of the video information as a basic timestamp;
  upon starting recording, obtaining a first-frame timestamp T0 of the video information, and aligning a first-frame timestamp of the bus packets with the first-frame timestamp T0 of the video information to obtain aligned bus packets and recording each frame timestamp Ty of the aligned bus packets;
  upon stopping recording, obtaining a tail-frame timestamp T1 of the video information and a tail-frame timestamp T2 of the bus packets;
  setting a ratio coefficient $k=(T1-T0)/(T2-T0)$;
  traversing all recorded bus packets and modifying and storing each frame timestamp Ty of the bus packets as Tx, wherein $Tx=T0+(Ty-T0)*k$;
  recording each frame timestamp Tx of the bus packets with a clock of the video information as basis; and
  displaying the time-synchronized bus packets and video information via a graphic interface.

14. The method according to claim 13, wherein the aligning the first-frame timestamp for the bus packets with the first-frame timestamp T0 of the video information to obtain the aligned bus packets and recording each frame timestamp Ty of the aligned bus packets comprises:
  defining the first-frame timestamp collected for the bus packets as T3; and
  defining a timestamp collected for any bus packet in a recording process as T, and obtaining each frame timestamp Ty collected for the aligned bus packets as $Ty=T-T3+T0$.

15. The method according to claim 13, wherein
the video information is transmitted in real time; and
the bus packets are transmitted via the bus adapter.

16. The method according to claim 13, wherein
a transmission frame rate of the bus packets is greater than or equal to 1000 frames/second.

* * * * *